US008633855B2

(12) United States Patent
Lee et al.

(10) Patent No.: US 8,633,855 B2
(45) Date of Patent: *Jan. 21, 2014

(54) PSEUDO-OMNI-DIRECTIONAL BEAMFORMING WITH MULTIPLE NARROW-BAND BEAMS

(75) Inventors: Jungwon Lee, Cupertino, CA (US); Hui-Ling Lou, Sunnyvale, CA (US)

(73) Assignee: Marvll World Trade Ltd., St. Michael (BB)

(*) Notice: Subject to any disclaimer, the term of this patent is extended or adjusted under 35 U.S.C. 154(b) by 0 days.

This patent is subject to a terminal disclaimer.

(21) Appl. No.: 13/451,257

(22) Filed: Apr. 19, 2012

(65) Prior Publication Data

US 2012/0202548 A1    Aug. 9, 2012

Related U.S. Application Data

(63) Continuation of application No. 12/197,527, filed on Aug. 25, 2008, now Pat. No. 8,164,521.

(60) Provisional application No. 60/957,518, filed on Aug. 23, 2007, provisional application No. 60/992,896, filed on Dec. 6, 2007.

(51) Int. Cl.
*G01S 1/08* (2006.01)

(52) U.S. Cl.
USPC ......................................................... 342/407

(58) Field of Classification Search
CPC ....................................................... H01Q 3/26
USPC ................... 342/371–372, 414; 455/68, 703
See application file for complete search history.

(56) References Cited

U.S. PATENT DOCUMENTS

| 4,996,532 | A | * | 2/1991 | Kirimoto et al. ................ 342/81 |
| 5,045,859 | A | * | 9/1991 | Yetter ............................ 342/414 |
| 6,549,762 | B1 |  | 4/2003 | Hirabe |
| 6,788,250 | B2 | * | 9/2004 | Howell .......................... 342/372 |

(Continued)

FOREIGN PATENT DOCUMENTS

| WO | WO-2004/114534 A1 | 12/2004 |
| WO | WO-2005/107100 A1 | 11/2005 |

OTHER PUBLICATIONS

Aoz, Specification of the Bluetooth System, Wireless connections made easy, Master Table of Contents & Compliance Requirements, Covered Core Package version: 2.0 + EDR Current Master TOC issues: Nov. 4, 2004.

(Continued)

*Primary Examiner* — Cassie Galt

(57) ABSTRACT

In a technique for communication with a station on a wireless network, the technique includes forming a plurality of narrow-band beams, each having a different angular direction from an antenna of a base station and collectively distributed over a beamspace to form a pseudo-omni-directional beam pattern. That beamspace may span an entire spherical region or a portion thereof, for example, when the narrow-band beams are broadcast over a sector of an entire spherical region. The technique may assign each of the plurality of narrow-band beams to a different frequency band (such as a different channel band or sub-channel) on the wireless network. The technique may simultaneously broadcast the plurality of narrow-band beams in a time-varying manner such that the angular direction of each of the plurality of narrow-band beams varies with time, where that variation may be random or ordered.

9 Claims, 10 Drawing Sheets

(56) References Cited

U.S. PATENT DOCUMENTS

| | | |
|---|---|---|
| 6,950,480 B2 | 9/2005 | Brown |
| 2002/0086708 A1 | 7/2002 | Teo et al. |
| 2002/0136233 A1 | 9/2002 | Chen et al. |
| 2002/0154687 A1* | 10/2002 | Bierly et al. ............. 375/222 |
| 2003/0195010 A1 | 10/2003 | Pattabiraman et al. |
| 2005/0128141 A1 | 6/2005 | Howell |
| 2008/0198793 A1 | 8/2008 | Lysejko et al. |

OTHER PUBLICATIONS

Barr, J.R., "Bluetooth SIG Overview," May 16, 2007, 1-14 found online at <https://mentor.ieee.org/802.11/file/07/11-07-0747-00-0000-bluetooth-sig-overview.ppt>.

Barr, J.R.:"Bluetooth Wireless Technology Overview," Sep. 19, 2007, 1-20, found online at <https://mentor.ieee.org/802.11/public-file/07/11-07-2361-00-0000-bluetooth-r-wireless-technology-overview.ppt>.

Breslin, "Adaptive Antenna Arrays Applied to Position Location," Thesis (1997).

Cheney, "The Linear Sampling Method and the MUSIC Algorithm" (2003).

How 802.11b/g WLAN and Bluetooth Can Play, Without standards-based solutions, ICs must referee spectrum rivalry, (2005).

IEEE 802.11h, Standard for Information Technology—Telecommunications and information exchange between systems—Local and metropolitan area networks—Specific requirements, Part 11: Wireless LAN Medium Access Control (MAC) and Physical Layer (PHY) specifications; Amendment 5: Spectrum and Transmit Power Management Extensions in the 5 GHz band in Europe (2003).

IEEE P802.11g/D8.2, Draft Supplement to Standard [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band (Supplement to ANSI/IEEE Std 802.11 1999 (Reaff 2003)).

IEEE P802.11n/D3.00, Draft Standard for Information Technology—Telecommunications and information exchange between systems—Local and metropolitan area networks—Specific Requirements—Part 11: Wireless LAN Medium Access Control (MAC) and Physical Layer (PHY) specifications: Amendment 4: Enhancements for Higher Throughput (2007).

IEEE Std 802.11b-1999/Cor Jan. 2001, Standard for Information Technology—Telecommunications and information exchange between systems—Local and metropolitan area networks—Specific Requirements—Part 11: Wireless LAN Medium Access Control (MAC) and Physical Layer (PHY) specifications; Amendment 2: Higher-speed Physical Layer (PHY) extension in the 2.4 GHz band—Corrigendum 1 (2001).

IEEE Std 802.11g/D2.8, May 2002 (Supplement to ANSI/IEEE Std 802.11, 1999 Edition), Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed PHysical Layer Extension in the 2.4 GHz Band.

IEEE Std for Local and metropolitan area networks, 802.16, Part 16: Air Interface for Fixed Broadband Wireless Access Systems, IEEE Computer Society and the IEEE Microwave Theory and Techniques Society (2004).

International Search Report from PCT/US2008/071623 dated Dec. 15, 2008.

International Search Report from PCT/US2008/074209 dated Mar. 25, 2009.

International Standard, ISO/IEC 8802-11, ANSI/IEEE Std 802.11, Information technology—Telecommunications and information exchange between systems—Local and metropolitan area networks—Specific requirements—Part 11: Wireless LAN Medium Access Control (MAC) and Physical Layer (PHY) specifications.

Lansford et al., "Wi-If (802.11 b) and Bluetooth: Enabling Coexistence," IEEE Netowrk, Sep./Oct. 2001, 20-27.

Spectral Estimation Using a MUSIC Algorithm, Nios II Embedded Processor Design Contest—Outstanding Designs 2005.

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band, IEEE Std 802.11a-1999.

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, IEEE Std 802.11b-1999.

TGn Sync Proposal Technical Specification , IEEE P802.11 Wireless LANs (2005).

Written Opinion from PCT/US2008/071623 dated Dec. 15, 2008.
Written Opinion from PCT/US2008/074209 dated Mar. 25, 2009.

* cited by examiner

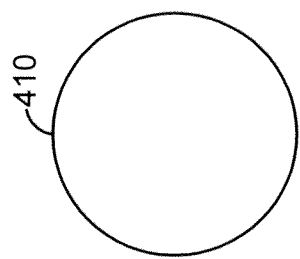
*FIG. 4B*
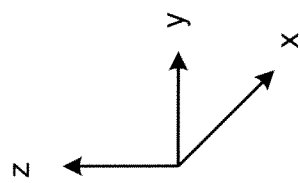
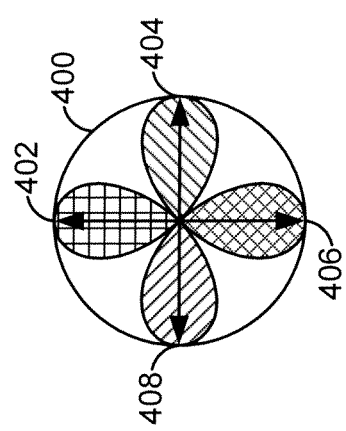
*FIG. 4A*

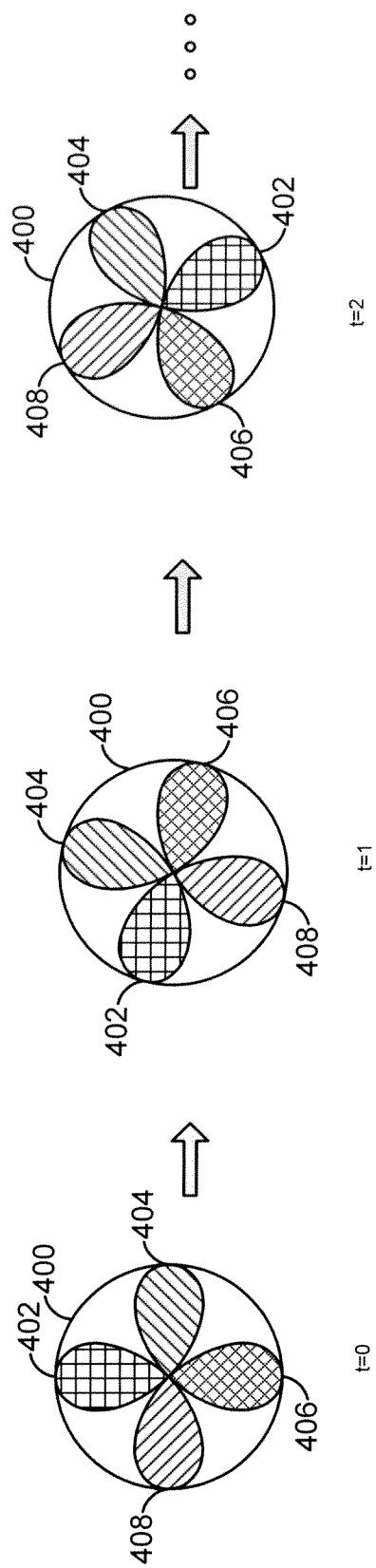

PSEUDO-OMNI-DIRECTIONAL BEAMFORMING WITH MULTIPLE NARROW-BAND BEAMS

CROSS-REFERENCE TO RELATED APPLICATION

The present application in a continuation of U.S. application Ser. No. 12/197,527, filed Aug. 25, 2008, which claims the benefit of U.S. Provisional Application Nos. 60/957,518, entitled "Omni-Directional Beamforming With Multiple Narrow-Band Beams," filed on Aug. 23, 2007, and 60/992,896, entitled "Pseudo-Omni-Directional Beamforming With Multiple Narrow-Beam Beams," filed on Dec. 6, 2007, which are both hereby incorporated by reference herein in their entirety.

FIELD OF TECHNOLOGY

The present disclosure relates generally to communication devices, and more particularly, to techniques for controlling the beam patterns from antennas on communication devices.

DESCRIPTION OF THE RELATED ART

Signal reception in a wireless network is a function of numerous variables, some optimized at the time of conception and design, others contingent on variations during use. One of these variables, in this case a design option, is the type of antenna used on the network.

In a wireless network, typically every transceiver uses an RF antenna to send and receive signals. Base stations and other signal hubs use antennas to broadcast signals to mobile stations or users on the network. In a short range Wireless Local Area Networks (WLANs), a router or signal hub would typically use an omni-directional antenna that transmits a uniform signal beam pattern covering all directions, that pattern having a spheroid shape. With omni-directional antennas the signal is typically weaker because signal energy is spread across a uniform distribution. But these antennas more easily identify remote devices on the network and have a signal strength that is directionally independent, only changing with the square of the radial distance to the antenna.

In contrast, many systems use directional antennas that direct a signal beam in a particular direction, instead of canvassing a large spherical beam pattern area. Directional antennas typically exhibit stronger gain along a particular direction and generally-speaking experience reduced interference from signals approaching from other directions. Such directionality can be achieved in various ways. Traditional directional antennas can be formed of arrays of antenna elements. In fact, some recent WLAN systems, i.e., based on the IEEE 802.11n standard, use multiple omni-directional antennas in an array configuration to create a directional beam pattern. Mobile cellular networks use sectored antennas, for example, three sectored antennas each covering about 120° and each supported by their own antenna set that may consist of 1 to 8 antennas. Sectorization and directionality may be achieved by adjusting the inputs to the antenna array, or by the use of external apertures. In any configuration, directional antennas offer the advantage of stronger signal strength, although they do require that the target be in a particular direction for communication. The effectiveness of directional antennas is thus linked to their effectiveness in directing a beam signal toward a mobile station.

Beamforming schemes are used to control the beam signal from a directional antenna. These schemes adjust the magnitude and phase of each antenna in a multi-antenna array to ultimately control the direction of the beam profile (gain profile) produced by the entire array. In this way, a base station need not send an omni-directional signal everywhere, but rather may use various beamforming schemes to identify and target particular mobile stations, even as those mobile stations move relative to the base station.

There are two conventional techniques for beamforming in a wireless network: feedback based beamforming and opportunistic beamforming. With feedback-based beamforming, a signal is broadcast in every direction, until a mobile station recognizes the signal and responds with a feedback signal indicating the amount of gain needed to be applied to that broadcast signal to improve reception. Feedback-based beamforming thus improves wireless communication system performance by isolating on the location of the mobile station and determining the beam signal strength needed to maintain quality communication with that mobile station. Opportunistic beamforming performs almost the same as true beamforming when there are many users present in a wireless system. The base station randomly sends out signals, until a mobile station receives the signal and responds with the received signal-to-noise ratio (SNR). The random nature of the broadcast ensures that even if there are multiple users in the wireless network each one will be in the direction of the beam at some point.

While common, neither beamforming technique is ideal. Feedback-based beamforming requires significant amounts of feedback from mobile stations. Opportunistic beamforming reduces the amount of feedback substantially, but introduces long latency times associated with obtaining a good channel signal connection between a base station and a mobile station. And of course one could use omni-directional broadcasts to reduce latency, but at the expense of signal strength. Thus, it would be desirable to provide improved beamshaping for antennas in wireless networks.

SUMMARY OF THE DISCLOSURE

In one embodiment, a method for communication with a station on a wireless network comprises: (a) forming a plurality of narrow-band beams, each having a different angular direction from an antenna of a base station, wherein the plurality of narrow-band beams are distributed over a beam-space to form a pseudo-omni-directional beam pattern; (b) assigning each of the plurality of narrow-band beams to a different frequency band of the wireless network; and (c) simultaneously broadcasting the plurality of narrow-band beams in a time varying manner such that the angular direction of each of the plurality of narrow-band beams varies with time.

In another embodiment, a method of communication between a base station and mobile stations in a wireless network comprises: the mobile stations receiving a pseudo-omni-directional beam pattern broadcast from the base station and containing a plurality of narrow-band beams each for a different sub-carrier of the wireless network; the mobile stations determining a feedback signal for each of the plurality of narrow-band beams received from the base station; and each mobile station transmitting the determined feedback signals for receipt at the base station.

In another embodiment, a transmitting station in a wireless network comprises: an antenna; and beamform controller to control the antenna and to assign each of a plurality of narrow-band beams to a different frequency band of the wireless network, wherein each of the plurality of narrow-band beams has a different angular direction from each other of the plurality of narrow-band beams, and wherein the plurality of narrow-band beams are distributed over a beamspace to form a pseudo-omni-directional beam pattern when broadcast from the antenna, and the beamform controller to simultaneously broadcast the plurality of narrow-band beams in a time varying manner such that the angular direction of each of the plurality of narrow-band beams varies with time.

In yet another embodiment, a mobile station in a wireless network comprises: an antenna to receive a broadcast pseudo-omni-directional beam pattern containing a plurality of narrow-band beams each for a different frequency band of the wireless network; and a controller to determine a feedback signal indicating a characteristic property for each narrow-band beam in the pseudo-omni-directional beam pattern and to transmit the feedback signal for receipt at a base station for scheduling communications between the base station and the mobile station.

BRIEF DESCRIPTION OF THE DRAWINGS

FIG. 4A illustrates a pseudo-omni-directional beam pattern as may be produced by the base station of FIG. 1;

FIG. 4B illustrates the beam pattern of an omni-directional antenna array;

FIGS. 5A-5C illustrate random shifting of the pseudo-omni-directional beam pattern of FIG. 4A at different times;

DETAILED DESCRIPTION

Figure 1:
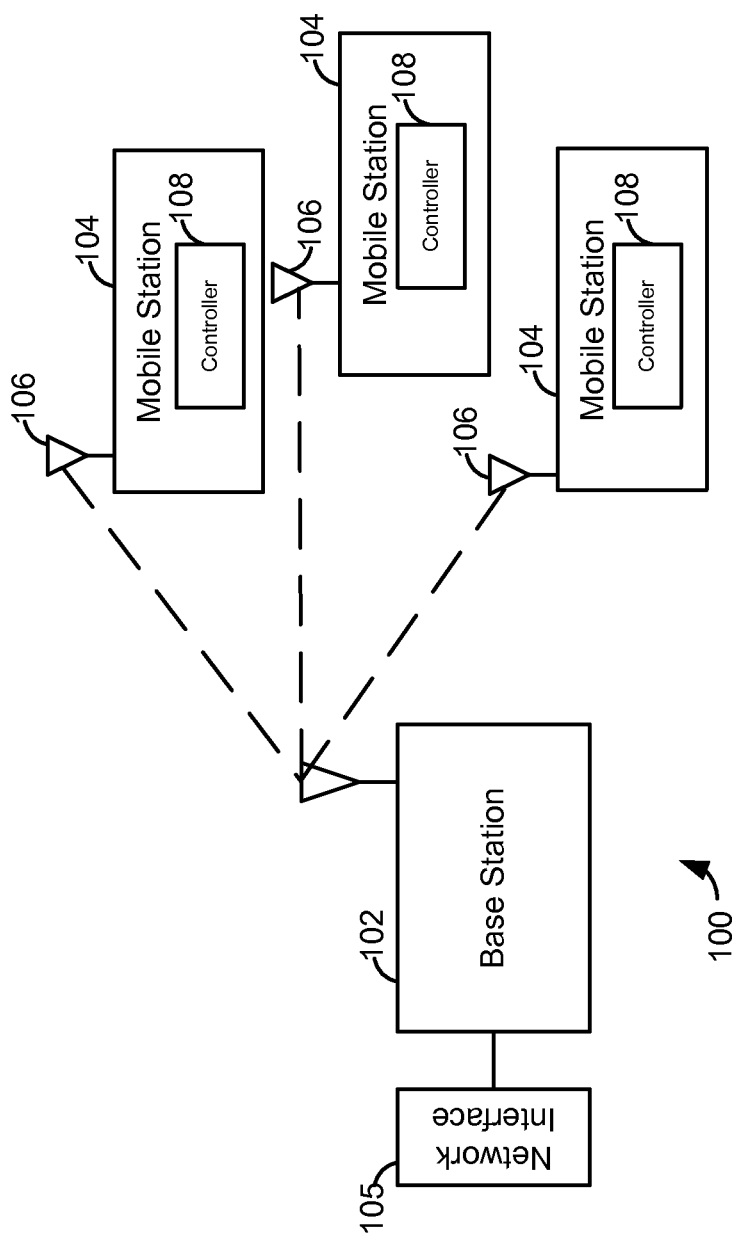
FIG. 1 illustrates of a base station and mobile stations in a wireless network.

FIG. 1 illustrates an example wireless communication network 100. The network 100 may be a WLAN network based on any one of the various Institute of Electrical and Electronics Engineers (IEEE) 802.11 standard wireless protocols, first promulgated in 1999, and which include at least IEEE 802.11a, 802.11b, 802.11n, and 802.11g. In other examples, the network 100 may represent a mobile cellular communications network, a radio broadcast network, a WiMAX network (such as one based on IEEE 802.16), or other wireless communication network. The network 100 may be an infrastructure-based network or an ad-hoc network. In the illustrated example, a base station 102 broadcasts data to and routes data between a plurality of mobile stations 104. The base station 102 may communicate with a larger area network, server, etc. through a network interface 105.

The mobile stations 104 represent any type of remote communication device, whether portable or not, whether physically moving or just remote from the base station 102. Examples include a portable digital assistant (PDA), cellular phone, vehicle, media player, laptop computer, wireless supported desktop computers, gaming systems, wireless networking devices such as routers, switches, etc., or any other portable computing device. Additional examples will be discussed below.

In the illustrated example, an antenna 106 and a controller 108 for each mobile station 104 are shown. The controller 108 receives a broadcast signal from a base station and received at the antenna 106. As further discussed below, the controller 108 is able to determine a feedback signal indicating a characteristic property of that broadcast signal, for example, a signal-to-noise ratio value for each narrow-band beam in a pseudo-omni-directional beam pattern from the base station. The controller 108 is further able to transmit this feedback signal back to the base station which may then schedule communications to the mobile station or among the various mobile stations on the wireless network based on this feedback signal.

Protocol-wise, the network 100 may communicate based on one of a number of acceptable modulation schemes including orthogonal frequency division multiplexing (OFDM) based modulation schemes, an example of which is further discussed below. Any digital modulation, analog modulation, or spread spectrum schemes may be used, including without limitation phase-shift key, quadrature amplitude modulation, frequency shift key, trellis coded modulation, amplitude shift keying, continuous phase modulation, frequency modulation, amplitude modulation, phase modulation, frequency-hopping spread spectrum, and direct-sequence spread spectrum.

Figure 2:
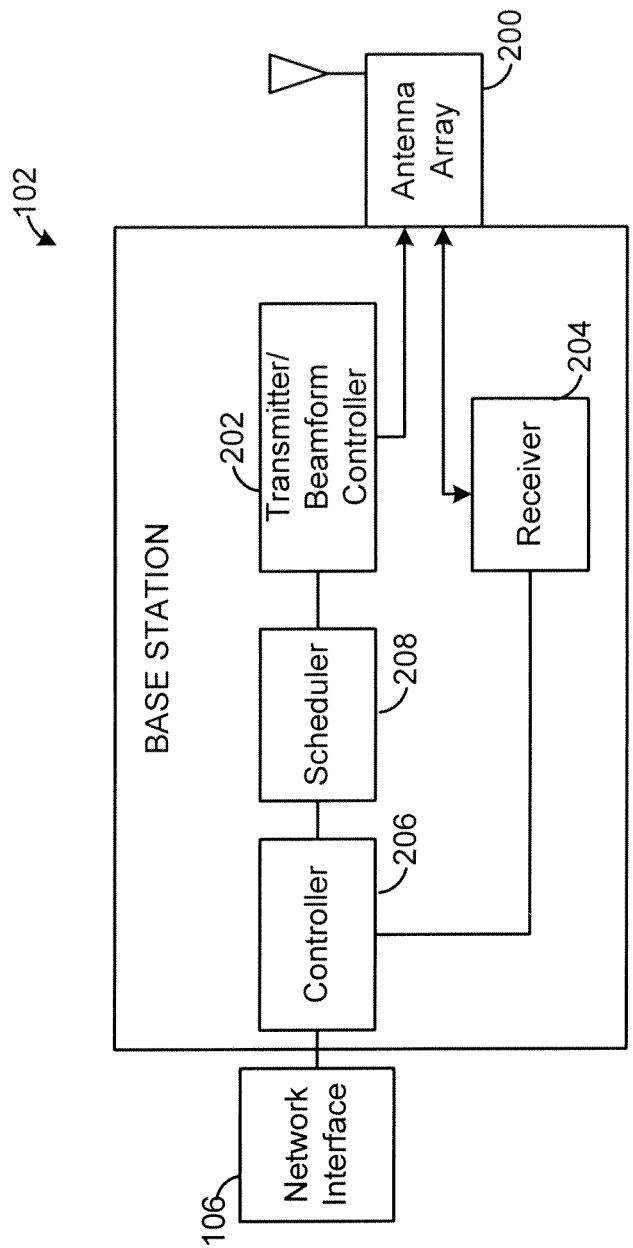
FIG. 2 is a block diagram illustration of the base station of FIG. 1 showing a beamform controller connected to an antenna array.

FIG. 2 illustrates an example implementation of the base station 102 employing a beamforming technique that improves upon conventional beamformers. In particular, the base station 102 includes antenna array assembly 200 that is capable of achieving pseudo-omni-directional beamforming using multiple narrow-band beams (also termed beam signals) to broadcast data on the wireless network 100. As used herein, the term "antenna" refers to both single- and multiple-antenna assemblies, an example of the later being an antenna array of multiple elements. The base station 102 may reduce latency significantly from opportunistic beamforming techniques and is easily implemented in OFDM systems, and others, with many sub-carriers. As discussed herein, this pseudo-omni-directional technique may involve randomly or controllably directing narrow-band beam signals across an entire three-dimensional region to locate and lock onto a mobile station.

Figure 3:
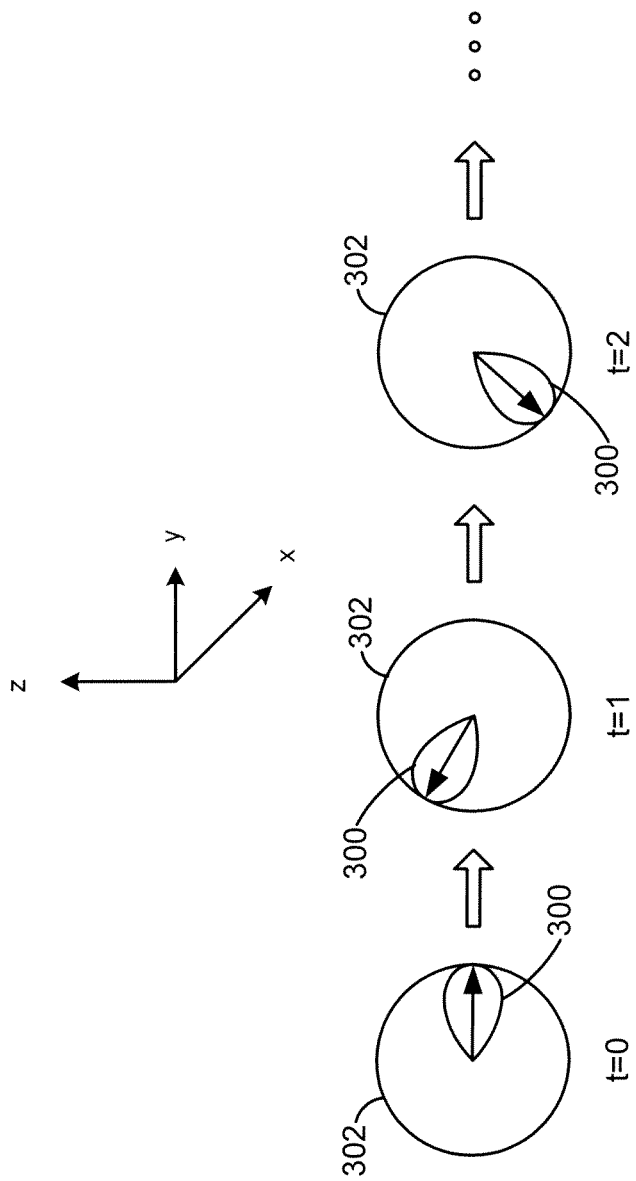
FIG. 3 illustrates a randomly varying narrow-band beam signal in accordance with a conventional opportunistic beamform technique.

For comparison purposes, FIG. 3 shows an example of an opportunistic beamforming technique in which an antenna is transmitting a single narrow-band beam signal 300 in random directions, from a time t=0, to a time t=1, to a time t=2, and so on. At t=0, the narrow-band signal beam 300 is directed in a first direction, arbitrarily shown along a y-axis and in a yz-plane. In a WiMax network, t=0 may correspond to a Frame 0 signal, for example. At t=1 the narrow-band beam signal 300 has shifted to another direction (angular position) about a center null of an overall beamspace 302. At t=2, the narrow-band beam signal 300 has shifted to yet another direction. Each beam signal is thus broadcast along a different, randomly-selected beamforming vector, as shown.

For a narrow-band system, opportunistic beamformer controllers generate the magnitude and phase adjustments for each antenna within the antenna array in an optimal manner for a given channel distribution. For example, if a broadcast channel is Rayleigh fading and the antenna array contains two transmitting antennas, then the following optimal magnitude and phase adjustments would be applied:

Magnitude: $A_1=\sqrt{\alpha_1}$, $A_2=\sqrt{1-\alpha_1}$, with $\alpha_1$ uniform in [0,1]

Phase: $\theta_1=0, \theta_2$ uniform in [0,2π]

where, in this example, the controller has received channel distribution information to better control the random nature of signal broadcasting.

For a wide-band system, opportunistic beamform controllers generate the magnitude and the phase for each antenna for each narrow-band sub-channel independently. For example, if the channel is Rayleigh fading and there are two transmitting antennas, the controller may generate the magnitude and the phase in the following way:

Magnitude: $A_1[k]=\sqrt{\alpha_1[k]}$, $A_2[k]=\sqrt{1-\alpha_1[k]}$, with $\alpha_1[k]$ uniform in [0,1]

–k: subchannel index

Phase: $\theta_1[k]=0$, $\theta_2[k]$ uniform in [0,2π]

For an opportunistic beamforming protocol, the base station transmitter may transmit a single beamforming vector randomly. The mobile station receiver measures channel quality from the received signal, e.g., in the form of a signal to noise ratio SNR, and transmits this measured channel quality (SNR) back to the base station. For example, the controller 108 may identify each narrow-band signal as corresponding to a different channel of an OFDM modulation, and then determine the SNR for each different channel/narrow-band signal. A base station scheduler receives all the SNR values for all mobile stations and calculates a scheduling metric for each mobile station based on the received SNR values. Example scheduling metrics include (1) instantaneous SNR and (2) instantaneous SNR divided by the average SNR over a certain period of time in the past. The base station scheduler then communicates with a base station transmitter to transmit data to the mobile station with the highest scheduling metric. The base station transmitter implements the schedule request by randomly changing the beamforming vector over time, which in turn changes the direction of the narrow-band beam signal. For practical reasons, the change rate on the beamforming vector is very slow.

The instantaneous SNR schedule metric uses the SNR values from each mobile station taken at a given point in time. In some cases, mobile stations that are closer in proximity to the base station will inherently have a higher SNR, even if the signal beam directed toward that mobile station is not fully optimized, that is, even if that mobile station is not in fact receiving the highest possible signal strength from the beamforming vector. Thus, some schemes may use a scheduling metric, in which the instantaneous SNR is averaged over time, to address such proximity errors.

In any event, returning to FIG. 2, the base station 102 improves upon these opportunistic beamforming techniques by offering pseudo-omni-directional beamforming with improved latency and higher accuracy. The base station 102 includes a transmitter/beamform controller 202 that controls beamforming in the array 200 to produce a pseudo-omni-directional beam signal. An example pseudo-omni-directional beam pattern is shown in FIG. 4A. A beam pattern 400 includes multiple narrow-band beam signals 402-408 each corresponding to a different channel or sub-carrier frequency. The beam signals 402-408 are compared to a narrow-band of the overall beamspace. The beam signals 402-408 are arranged such that collectively they cover many directions, and collectively form the pseudo-omni-directional beam pattern 400, where the pattern is termed pseudo because unlike the full omni-directional beam pattern 410 of FIG. 4B, the entire available beamspace is not subsumed by the beam signals 402-408. Instead, the beam signals 402-408 are arranged to selectively approximate an omni-directional beamspace.

In the illustrated example, the omni-directional beamspace pattern 400 created by the narrow-band beams signals 402-408 spans 360°. The signals 402-408 rotate to cover all 360° of that pattern 400. In other examples, however, the beamspace may be a sector beamspace that covers less than 360°, and the signals may rotate in that sector to cover all angles of that sector only. For example, in a mobile cellular network, the 360° beamspace may be divided into three 120° sectors, each with different narrow-band beam signals generated by different sector antenna assemblies (e.g., comprising 1 to 8 antennas). Each sector of narrow-band beam signals forms a different pseudo-omni-directional beam pattern.

The narrow-band beam signals 402-408 are generated depending on frequency. The beam signals 402-408 may be broadcast simultaneously, but in a uniform distribution manner with respective beam lobes that are orthogonal to one another (with orthogonal beamforming vectors), and thus do not overlap. The particular pattern 400 may then be changed randomly to allow the base station 102 to identify the mobile stations 104 desired for a particular channel, regardless of location.

FIGS. 5A-5C show the beam pattern of FIG. 4A resulting from randomly shifting the pseudo-omni-directional beam pattern 400 and the beam signals 402-408 in a random time-varying manner. In the illustration, the beam signals 402-408 maintain their interrelational order, i.e., looking at the beam pattern the beam channel ordering is maintained around the central null. However, the entire beam pattern 400 is randomly shifted from an initial time, t=0, in FIG. 5A, through time t=1 in FIG. 5B, to a time t=2 in FIG. 5C. That is, the directions of the narrow-band beam signals 402-408 may be changed over time, while, at a given time, generally all beam directions are covered by the multiple beams 402-408, due to the pseudo-omni-directional distribution of the narrow-band beams. Further, even with randomization, nearly the entire beamspace will be polled for mobile stations at any given instant.

While FIGS. 5A-5C are described as illustrating multiple beams broadcast in a random time-varying manner, in other examples these beams may be broadcast in an ordered time-varying manner, for example, rotating around an antenna null at a constant rate. That ordered time-varying manner may be a clockwise or counterclockwise rotation about a central null of the antenna may be used on the narrow-band beams.

In application, each mobile station 104 may measure the SNR for each frequency band signal, i.e., each received narrow-band beam signal 402-408, during random broadcasting, and report the SNR back to the base station 102. For example, the mobile stations 104 may present a quantized SNR or modulation and coding set (MCS) back to the base station 102. A receiver 204 communicates the SNR data to a controller 206 that assesses the SNRs from the various mobile stations, and communicates scheduling control data to a scheduler 208 which schedules the mobile stations 104 for each frequency band using a scheduling metric, for example, a proportional-fair scheduling scheme, instantaneous SNR scheme as discussed above, an averaged instantaneous SNR scheme as discussed above, or other scheduling metric.

Figure 6:
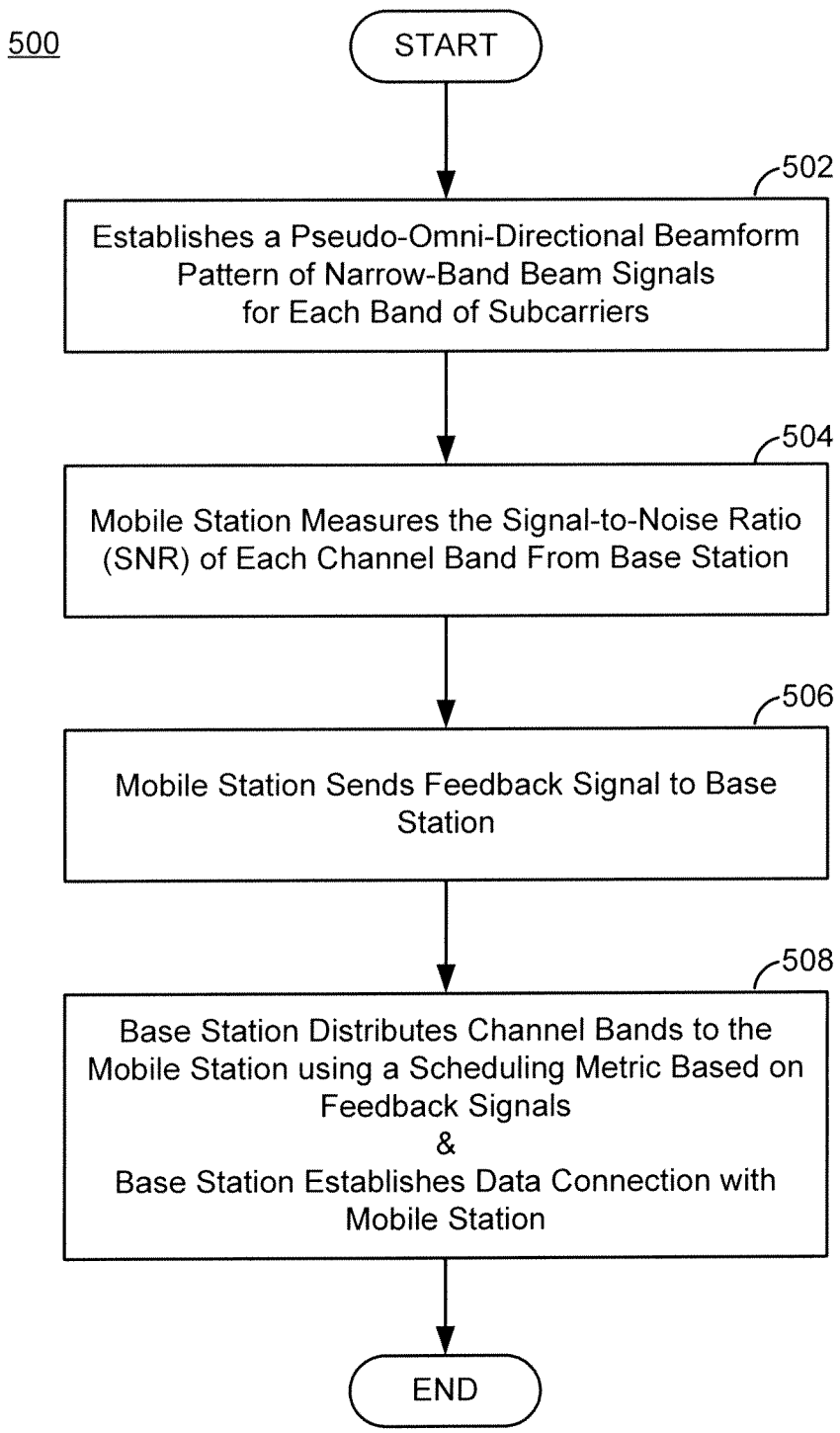
FIG. 6 is a flow diagram of a technique for communication between the base station and mobile stations of FIG. 1.

FIG. 6 illustrates an example protocol 500 for producing a pseudo-omni-directional beamforming protocol. In block 502, a base station transmitter/beamform controller controls an antenna array to establish a pseudo-omni-directional beamform pattern containing a different narrow-band beam signal for each band of sub-carriers. At block 504, the mobile station receiver measures the SNR of each channel band received from the base station. At block 506, the mobile station feedbacks the SNR signal to the base station, where that SNR signal may be a quantized signal. Alternatively, the mobile station may feedback only the modulation and coding set (MCS) data that can be supported between the base station and the mobile station. Based on the feedback from all the mobile stations, the base station distributes the frequency bands to multiple mobile stations with their requested MCS, at block 508. Further, the base station transmitter/beamform controller may change the beamforming vector over time as desired to maintain communication.

A benefit to some systems is that, whereas for feedback-based beamforming techniques the mobile station needs to feedback the SNR and the beamforming vector for each channel band, with pseudo-omni-directional beamforming the mobile station may only feedback the SNR for each channel band, not the beamform vector.

Figure 7:
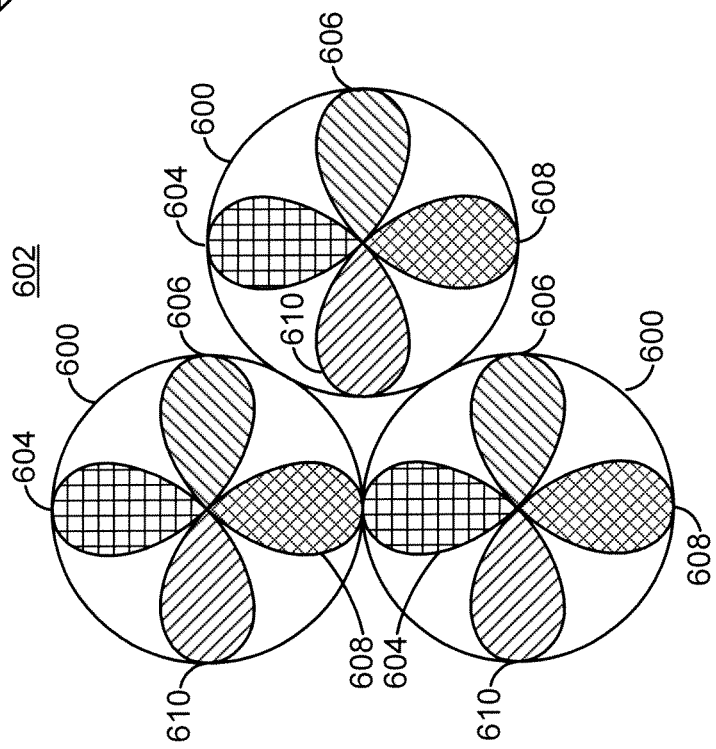
FIG. 7 illustrates an example technique for forming a pseudo-omni-directional beam pattern from a plurality of base stations.

FIG. 7 illustrates another example pseudo-omni-directional beamforming technique using multiple base stations each producing a pseudo-omni-directional beam pattern 600. These beam patterns 600 are combined to form an overall beam pattern 602. Each base station defines a cell corresponding to the beam pattern 600. And each base station produces the same randomly varying beam signals 604-610, e.g., each corresponding to a different channel. The patterns 600 are positioned in a uniform manner to direct each channel beam signal 604-610 to point in the same general beamforming vector direction. For example, channel beam signal 608 in each base station is pointing in a −z direction, and channel beam signals 606 are pointing in a +y-direction. In this way, multiple base station may be used to increase signal strength in each channel. Further, by coordinating the pseudo-omni-directional beamforming from each base station, the signal strength for each channel in a particular direction is increased, while interference among cells is minimized.

FIG. 7 thus provides an example configuration of how multiple base stations can be configured in space and/or in beamforming directionality to each produce a pattern of narrow-band beams that have been assigned to the same set of sub-channels or channels of a wide-band bandwidth region. The sub-channels or channels are assigned in such a way that each base station may simultaneously broadcast its respective version of each sub-channel or channel in generally the same direction.

Figure 8:
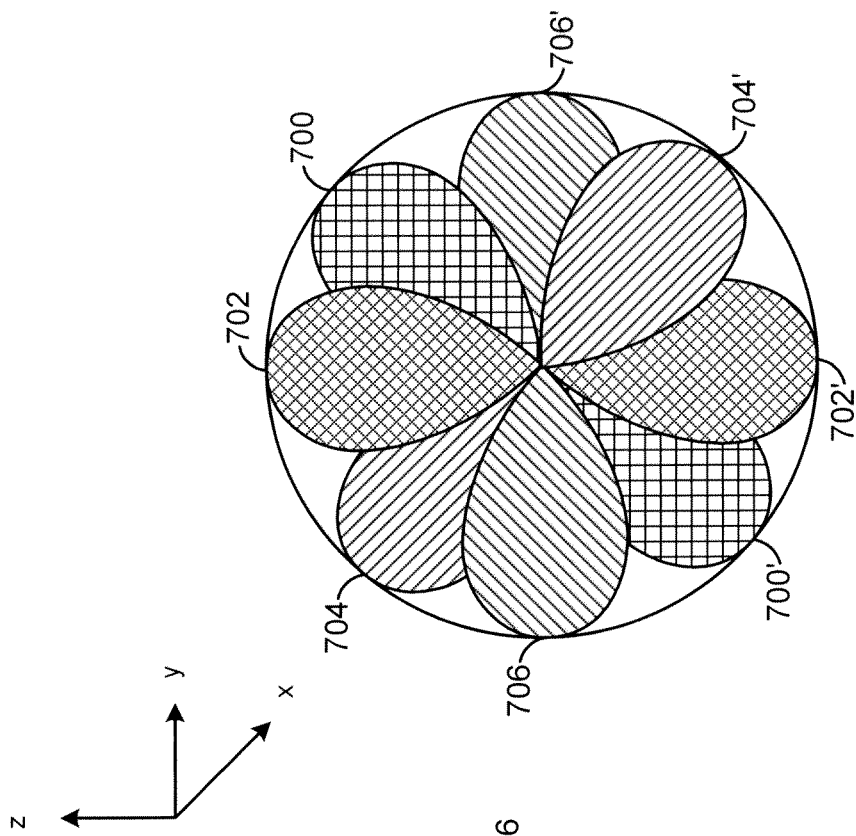
FIG. 8 illustrates another example technique for forming a pseudo-omni-directional beam pattern.

FIG. 8 illustrates another example beamforming technique, where multiple orthogonal beam signals are generated in each frequency band. The result is multiple orthogonal beams and multiple narrow-frequency-band beams will be able to cover more directions uniformly. This technique is based on the multi-user MIMO concept, where multiple spatial streams are generated for a given time and frequency with each stream directed to different users. Two different broadcast signal streams each broadcasting the four channel bands (i.e., beam signals), result in two simultaneous broadcasts of each channel band. The channel bands are arranged in an orthogonal configuration, that is, with the same channel band of a first stream being 180° out of phase with that same channel band from a second stream. For example, channel band 700 appears twice 180° (700 and 700') from that produced by the other stream. The same is true for channel bands 702-706. The prime reference indicates the second stream.

To use a pseudo-omni-directional beamforming technique in a narrow-band wireless communication scheme, e.g., one containing one or a small number of channels, each channel may be partitioned into N narrow-band sub-channels. OFDM systems may be used in this way, with each sub-channel having a width that is less than the coherence bandwidth of the corresponding channel. Take two example scenarios.

First, for a scenario where N>>1, the transmitter/beamform controller (e.g., controller 202) may choose N beamforming vectors ($B_1, B_2, \ldots, B_N$) such that the vectors approximately follow an optimum distribution, such as approximating an omni-directional beamspace. The N beamforming vectors (and corresponding beam signals) may be sized and angularly positioned to be evenly distributed about an entire beamspace, such as with FIGS. 4A, 4B, 5A-5C, 7, and 8 above. The transmitter/beamform controller may then randomly assign the beamforming vectors ($B_1, B_2, \ldots, B_N$) to different sub-channels (1 to N) upon each transmission slot. In other examples, the beamforming vectors ($B_1, B_2, \ldots, B_N$) may be assigned to each sub-channel (1 to N) in an ordered manner upon each transmission slot. For example, for a first transmission slot, the controller may assign $B_1, B_2, \ldots, B_N$ to sub-channels 1 to N, while in a second transmission slot, the controller may assign $B_2, B_3, \ldots, B_N, B_1$ to sub-channels 1 to N. By having the sub-channel width below the coherence bandwidth of the channel, N number of sub-channels can be altered in this way without signal loss.

Second, for a scenario where N is small enough that N beamforming vectors cannot approximate effectively an optimum distribution, the transmitter/beamform controller may choose M sets of N beamforming vectors such that the vectors in each set approximately follow the optimum distribution and such that all MN beamforming vectors follow the optimum distribution.

For example, let the beamforming vectors be $B_{1,1}, B_{2,1}, \ldots, B_{N,1}, B_{1,2}, B_{2,2}, \ldots, B_{N,2}, \ldots, B_{1,M}, B_{2,M}, \ldots, B_{N,M}$. That is, the set of vectors may be expressed as $S_i = \{B_{1,i}, B_{2,i}, \ldots, B_{N,i}\}$ for $1 \leq i \leq M$. The beamforming vectors in each set represent the omni-directional beams. With the beamforming vectors set, the transmitter/beamform controller may slot the vectors in one of two ways. One, at each transmission slot, the controller may randomly choose i beamform vectors and distribute them to various sub-channels 1 to N. Two, the controller may cycle through all the sets of beamforming vectors, starting from the first set for the first transmission slot.

To use a pseudo-omni-directional beamforming technique in a wide-band wireless communication scheme, e.g., one containing a large number K of channels, the entire wideband used bandwidth may be partitioned into K channels, with each channel further partitioned into L narrow narrow-band sub-channels, resulting in N=KL sub-channel partitions. As a result, each channel is almost flat-fading within L consecutive narrow-band sub-channels. OFDM systems may be used to achieve this system as well.

The transmitter/beamform controller may apply the same scheme as omni-directional beamforming for narrow-band systems. Take two example scenarios. In the first scenario, the controller generates beamforming vectors for each channel band independently, without regard to the beamforming vectors for the other channel bands. In the second scenario, the controller generates beamforming vectors for each channel band such that any L consecutive sub-channels will contain the same set of beamforming vectors.

For this second scenario in particular, if L is small enough that the L beamform vectors cannot approximate an optimum distribution, the controller may first choose M sets of the L beamform vectors such that the beamform vectors in each set approximately follow the optimum distribution, and such that all ML beamforming vectors also follow the optimum distribution. The beamform vectors are expressed as $B_{1,1}, B_{2,1}, \ldots, B_{L,1}, B_{1,2}, B_{2,2}, \ldots, B_{L,2}, \ldots, B_{1,M}, B_{2,M}, \ldots, B_{L,M}$.

Once the beamform vector sets are established, the transmitter/beamform controller assigns the vectors. In some examples, the controller may assign vectors before each transmission slot by randomly choosing i beamforming vectors of the set and distributing $B_{1,i}$, $B_{2,i}$, . . . , $B_{L,i}$ to sub-channel kL+1 to kL+L for every k in [0, K−1]. In other examples, the controller may distribute the set of the beamforming vectors to sub-channel kL+1 to kL+L for every k in [0,K−1] in an orderly way. For example, at the first transmission slot, the controller may apply $B_{1,1}$, $B_{2,1}$, . . . , $B_{L,1}$ to sub-channel kL+1 to kL+L for every k in [0,K−1], and at the second transmission slot, apply $B_{1,2}$, $B_{2,2}$, . . . , $B_{L,2}$ to sub-channel kL+1 to kL+L for every k in [0,K−1], etc.

In many OFDM systems, the channel is estimated based on the assumption that the channel is not frequency selective, i.e., the channel between two adjacent pilot sub-carriers does not change much. Therefore, it may be beneficial to use the same beamforming vector for a band of consecutive sub-carriers. Furthermore, for OFDM systems, the channel quality for each sub-carrier can be measured by the mobile station and fed-back to the base station. The use of the same beamforming vector for a band of consecutive sub-carriers may also help reduce the amount of feedback, because the channel quality information may simply be determined for each band and fed-back to the base station, instead of determining channel quality for each sub-carrier.

For example, for an OFDM transmitter/beamform controller having a 1024 Fast Fourier Transformers (FFT) block and corresponding constellation mapping inputs, a total of 1024 sub-carriers may exist. The number of sub-carriers in one band sharing the same beamforming vector may be 16, as determined by the amount of feedback tolerable at the base station receiver. In this example, the maximum number of distinct beamforming vectors will be 1024/16=64. That is, the number of distinct beamforming vectors can be chosen to be anywhere from 1 to 64. The exact number may be set to stay within the coherence bandwidth of the channel band and to minimize latency. The coherence bandwidth is the band over which the channel band does not change much in frequency and may be determined by the RMS delay spread of the channel band. By repeating the beamforming pattern over the coherence bandwidth, it is likely that at least one narrow-band beam signal has a good channel. Beyond these factors, the number of transmit antennas and their orientation within the antenna array help determine the shape, directivity, and gain of a beam signal and thus will effect the number of orthogonal beamforming vectors, as well.

Figure 9A:
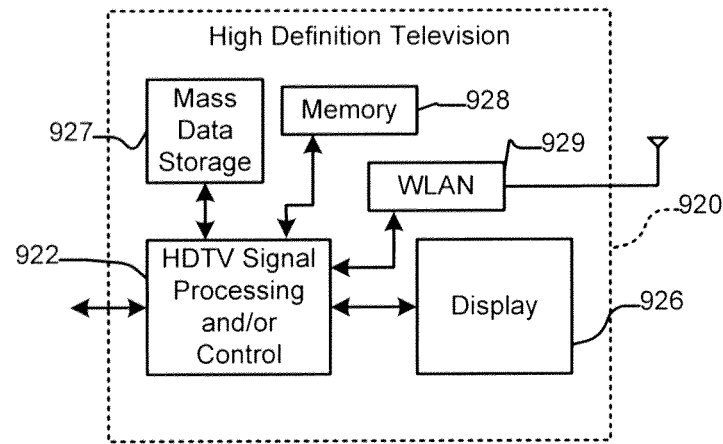
FIGS. 9A-9F illustrate embodiments of circuits that may incorporate a beamform controller for controlling an antenna array.

Referring now to FIG. 9A, the pseudo-omni-directional beamforming techniques described herein may be utilized in a high definition television (HDTV) 920. HDTV 920 includes a mass data storage 927, an HDTV signal processing and control block 922, an RF wireless local area network (WLAN) interface and memory 928. HDTV 920 receives HDTV input signals in a wireless format and generates HDTV output signals for a display 926. In some implementations, signal processing circuit and/or control circuit 922 and/or other circuits (not shown) of HDTV 920 may process data, perform coding and/or encryption, perform calculations, format data and/or perform any other type of HDTV processing that may be required.

HDTV 920 may communicate with a mass data storage 927 that stores data in a nonvolatile manner such as optical and/or magnetic storage devices. The mass storage device may be a mini HDD that includes one or more platters having a diameter that is smaller than approximately 1.8". HDTV 920 may be connected to memory 928 such as RAM, ROM, low latency nonvolatile memory such as flash memory and/or other suitable electronic data storage. HDTV 920 also may support connections with a WLAN via a WLAN network interface 929. Both the HDTV signal processor 922 and the WLAN network interface 929 may include a beamform controller controlling an antenna array as discussed herein.

Figure 9B:
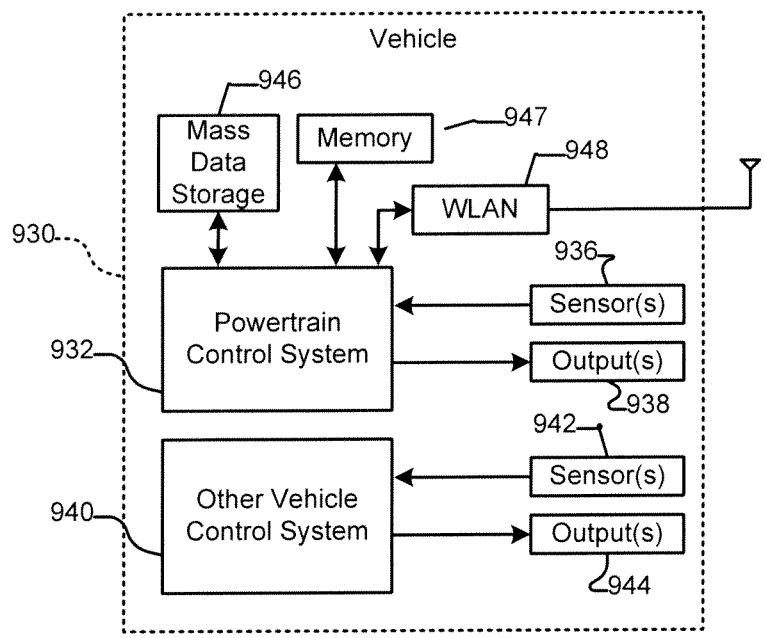

Referring now to FIG. 9B, the pseudo-omni-directional beamforming techniques described herein may be utilized in a vehicle 930. The vehicle 930 includes a control system that may include mass data storage 946, as well as a WLAN interface 948. The mass data storage 946 may support a powertrain control system 932 that receives inputs from one or more sensors 936 such as temperature sensors, pressure sensors, rotational sensors, airflow sensors and/or any other suitable sensors and/or that generates one or more output control signals 938 such as engine operating parameters, transmission operating parameters, and/or other control signals.

Control system 940 may likewise receive signals from input sensors 942 and/or output control signals to one or more output devices 944. In some implementations, control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 932 may communicate with mass data storage 927 that stores data in a nonvolatile manner such as optical and/or magnetic storage devices. The mass storage device 946 may be a mini HDD that includes one or more platters having a diameter that is smaller than approximately 1.8". Powertrain control system 932 may be connected to memory 947 such as RAM, ROM, low latency nonvolatile memory such as flash memory and/or other suitable electronic data storage. Powertrain control system 932 also may support connections with a WLAN via a WLAN network interface 948. The control system 940 may also include mass data storage, memory and/or a WLAN interface (all not shown). In one exemplary embodiment, the WLAN network interface 948 may include a beamform controller controlling an antenna array as discussed herein.

Figure 9C:
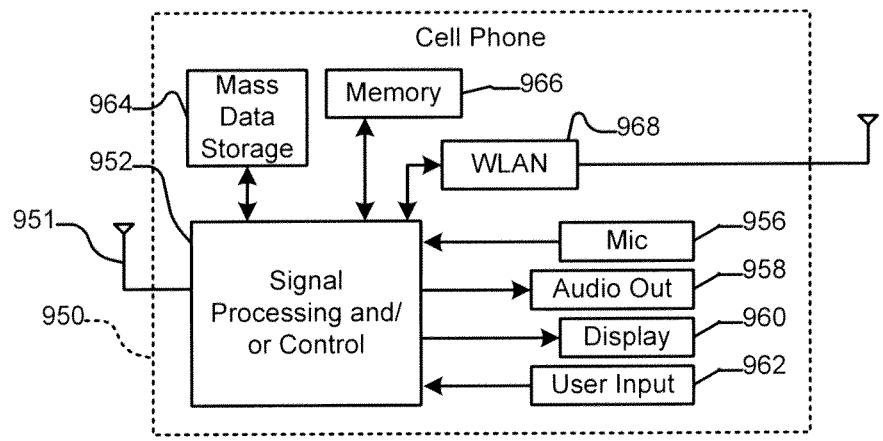

Referring now to FIG. 9C, the pseudo-omni-directional beamforming techniques described herein may be used in a cellular phone 950 that may include a cellular antenna 951. The cellular phone 950 may include either or both signal processing and/or control circuits, which are generally identified in FIG. 9C at 952, a WLAN network interface 968 and/or mass data storage 964 of the cellular phone 950. In some implementations, cellular phone 950 includes a microphone 956, an audio output 958 such as a speaker and/or audio output jack, a display 960 and/or an input device 962 such as a keypad, pointing device, voice actuation and/or other input device. Signal processing and/or control circuits 952 and/or other circuits (not shown) in cellular phone 950 may process data, perform coding and/or encryption, perform calculations, format data and/or perform other cellular phone functions.

Cellular phone 950 may communicate with mass data storage 964 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 950 may be connected to memory 966 such as RAM, ROM, low latency nonvolatile memory such as flash memory and/or other suitable electronic data storage. Cellular phone 950 also may support connections with a WLAN via a WLAN network interface 968 that may include a beamform controller controlling the antenna array 951 as discussed herein.

Figure 9D:
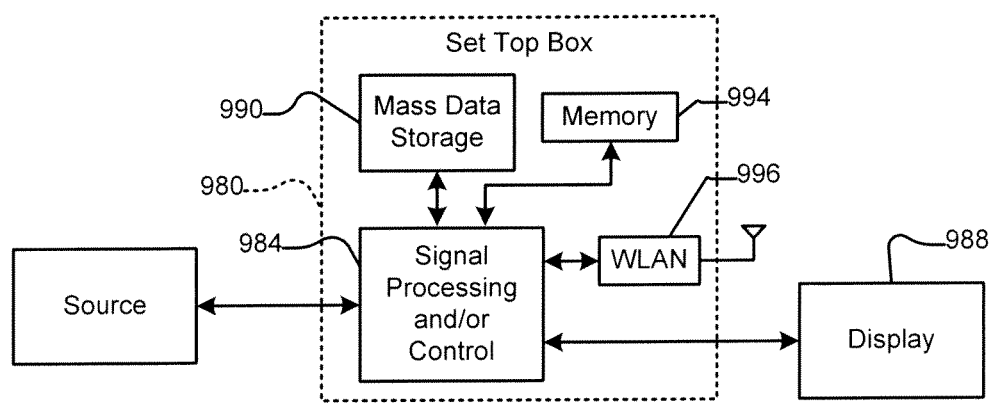

Referring now to FIG. 9D, the pseudo-omni-directional beamforming techniques described herein may be utilized in a set top box 980. The set top box 980 may include either or both signal processing and/or control circuits, which are generally identified in FIG. 9D at 984, a WLAN interface and/or mass data storage 990 of the set top box 980. Set top box 980 receives signals from a source such as a broadband source and outputs standard and/or high definition audio/video signals suitable for a display 988 such as a television and/or monitor and/or other video and/or audio output devices. Signal processing and/or control circuits 984 and/or other circuits (not shown) of the set top box 980 may process data, perform coding and/or encryption, perform calculations, format data and/or perform any other set top box function.

Set top box 980 may communicate with mass data storage 990 that stores data in a nonvolatile manner and may use jitter measurement. Mass data storage 990 may include optical and/or magnetic storage devices for example hard disk drives HDD and/or DVDs. The HDD may be a mini HDD that includes one or more platters having a diameter that is smaller than approximately 1.8". Set top box 980 may be connected to memory 994 such as RAM, ROM, low latency nonvolatile memory such as flash memory and/or other suitable electronic data storage. Set top box 980 also may support connections with a WLAN via a WLAN network interface 996. The WLAN network interface 996 may include a beamform controller controlling an array antenna as discussed herein.

Figure 9E:
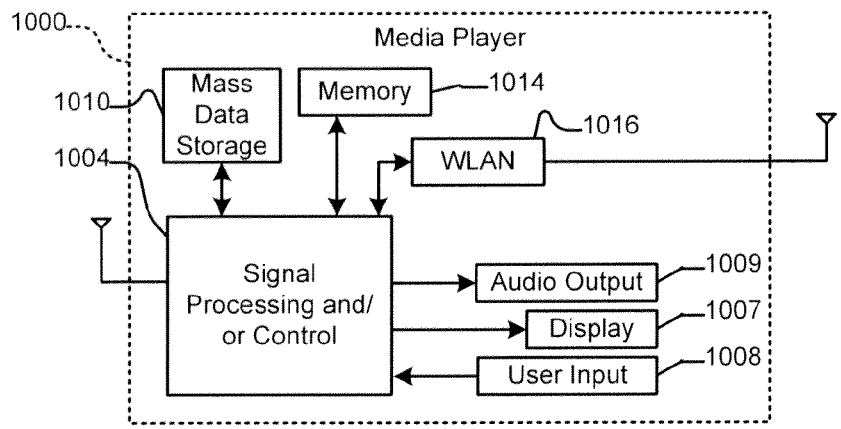

Referring now to FIG. 9E, the pseudo-omni-directional beamforming techniques described herein may be used in a media player 1000. The media player 1000 may include either or both signal processing and/or control circuits, which are generally identified in FIG. 9E at 1004, a WLAN interface and/or mass data storage 1010 of the media player 1000. In some implementations, media player 1000 includes a display 1007 and/or a user input 1008 such as a keypad, touchpad and the like. In some implementations, media player 1000 may employ a graphical user interface (GUI) that typically employs menus, drop down menus, icons and/or a point-and-click interface via display 1007 and/or user input 1008. Media player 1000 further includes an audio output 1009 such as a speaker and/or audio output jack. Signal processing and/or control circuits 1004 and/or other circuits (not shown) of media player 1000 may process data, perform coding and/or encryption, perform calculations, format data and/or perform any other media player function.

Media player 1000 may communicate with mass data storage 1010 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1000 may be connected to memory 1014 such as RAM, ROM, low latency nonvolatile memory such as flash memory and/or other suitable electronic data storage. Media player 1000 also may support connections with a WLAN via a WLAN network interface 1016. The WLAN network interface 1016 and/or signal processing circuits 1004 may include a beamform controller controlling an antenna array as discussed herein.

Figure 9F:
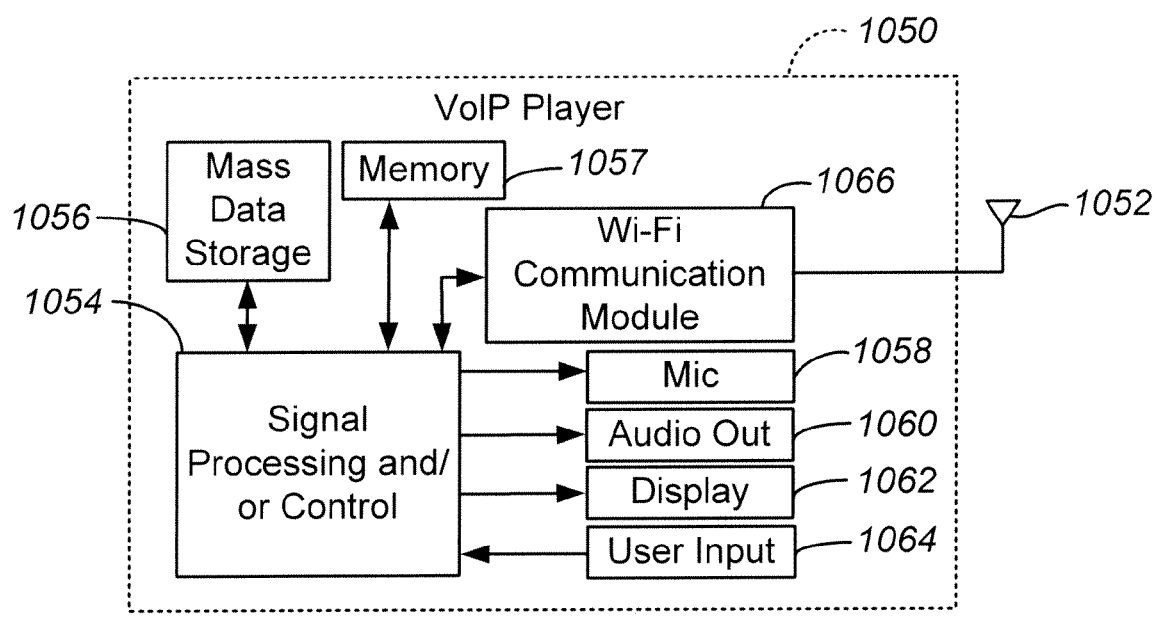

Referring to FIG. 9F, the pseudo-omni-directional beamforming techniques described herein may be utilized in a Voice over Internet Protocol (VoIP) phone 1050 that may include an antenna 1052. The VoIP phone 1050 may include either or both signal processing and/or control circuits, which are generally identified in FIG. 9F at 1054, a wireless interface and/or mass data storage of the VoIP phone 1050. In some implementations, VoIP phone 1050 includes, in part, a microphone 1058, an audio output 1060 such as a speaker and/or audio output jack, a display monitor 1062, an input device 1064 such as a keypad, pointing device, voice actuation and/or other input devices, and a Wireless Fidelity (WiFi) communication module 1066. Signal processing and/or control circuits 1054 and/or other circuits (not shown) in VoIP phone 1050 may process data, perform coding and/or encryption, perform calculations, format data and/or perform other VoIP phone functions.

VoIP phone 1050 may communicate with mass data storage 1056 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1050 may be connected to memory 1057, which may be a RAM, ROM, low latency nonvolatile memory such as flash memory and/or other suitable electronic data storage. VoIP phone 1050 is configured to establish communications link with a VoIP network (not shown) via WiFi communication module 1066. The WiFi communication module 1066 may include a beamform controller controlling an antenna array as discussed herein, for use in communicating data via the WiFi communication module 1066 or via the audio output 1060 in communication with an accessory, such as a Bluetooth headset (not depicted).

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. An apparatus comprising:
an antenna; and
a beamform controller configured to determine a plurality of beamforming vectors to control the antenna, wherein the antenna is to transmit over a wireless network, and wherein the plurality of beamforming vectors are determined to assign each of a plurality of narrow-band beams, broadcast from the antenna, to a different frequency band of the wireless network,
wherein the beamform controller is further configured to determine the plurality of beamforming vectors such that each of the plurality of narrow-band beams from the antenna has a different angular direction from each other of the plurality of narrow-band beams, and wherein the plurality of narrow-band beams are distributed over a beamspace to form a pseudo-omni-directional beam pattern when broadcast from the antenna, and
wherein the beamform controller is further configured to simultaneously broadcast the plurality of narrow-band beams in a time-varying manner such that the angular direction of each of the plurality of narrow-band beams varies with time.

2. The apparatus of claim 1, wherein the time-varying manner comprises a random time-varying manner.

3. The apparatus of claim 1, wherein the time-varying manner comprises an ordered time-varying manner.

4. The apparatus of claim 3, wherein the ordered time-varying manner is a clockwise or counterclockwise rotation of the narrow-band beams about a central null of the antenna.

5. The apparatus of claim 1, wherein the beamform controller is further configured to control the antenna such that the angular directions for the plurality of narrow-band beams are uniformly distributed around a central null of the antenna.

6. The apparatus of claim 1, wherein the beamform controller is further configured to control the antenna such that the angular directions for the plurality of narrow-band beams are orthogonal to one another.

7. The apparatus of claim 1, wherein the apparatus is a base station.

8. The apparatus of claim 1, wherein the antenna comprises an array of antenna elements for transmitting the plurality of narrow-band beams over a 360° beamspace.

9. The apparatus of claim 1, wherein the antenna comprises antenna elements for transmitting the plurality of narrow-band beams over a sector beamspace spanning less than 360°, where the pseudo-omni-directional beam pattern spans the sector beamspace.

* * * * *